US011230318B2

(12) United States Patent
Toko et al.

(10) Patent No.: US 11,230,318 B2
(45) Date of Patent: Jan. 25, 2022

(54) STEERING CONTROL APPARATUS AND STEERING CONTROL METHOD

(71) Applicants: JTEKT CORPORATION, Osaka (JP); TOYOTA JIDOSHA KABUSHIKI KAISHA, Toyota (JP)

(72) Inventors: Takahiro Toko, Takahama (JP); Nobuaki Kataoka, Okazaki (JP); Yukinobu Ezaki, Kasugai (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 16/460,515

(22) Filed: Jul. 2, 2019

(65) Prior Publication Data
US 2020/0010112 A1   Jan. 9, 2020

(30) Foreign Application Priority Data

Jul. 9, 2018   (JP) .............................. JP2018-130197

(51) Int. Cl.
*B62D 6/00* (2006.01)
*B62D 5/04* (2006.01)
*B62D 15/02* (2006.01)

(52) U.S. Cl.
CPC ......... *B62D 5/0469* (2013.01); *B62D 5/0409* (2013.01); *B62D 5/0463* (2013.01); *B62D 15/022* (2013.01)

(58) Field of Classification Search
CPC ............... B62D 5/0469; B62D 5/0409; B62D 5/0463; B62D 15/022; B62D 5/046; B62D 6/00
(Continued)

(56) References Cited

U.S. PATENT DOCUMENTS

2008/0281490 A1*  11/2008  Wittig ................. B62D 5/0457
                                                  701/41
2014/0081524 A1*   3/2014  Tamaizumi ............ B62D 7/159
                                                  701/42
(Continued)

FOREIGN PATENT DOCUMENTS

DE    102015219160 A1    4/2016
EP       2 708 445 A2    3/2014
(Continued)

OTHER PUBLICATIONS

Dec. 2, 2019 Extended Search Report issued in European Patent Application No. 19184656.7.

*Primary Examiner* — Shardul D Patel
(74) *Attorney, Agent, or Firm* — Oliff PLC

(57) ABSTRACT

A steering control apparatus for a steering system includes a controller. The controller sets a limit value to less than or equal to a steering angle limit value, the limit value being an upper limit of an absolute value of a torque command value, and controls a motor such that a motor torque follows the torque command. When the absolute value of a rotation angle of a rotary shaft exceeds a steering angle threshold, the controller computes a damping control amount such that the damping control amount increases with an increase in an excess of an angular velocity of the rotary shaft over a first upper limit angular velocity. The controller computes the torque command value based on a value obtained by combining the basic command value and the damping control amount such that an absolute value of the basic command value is reduced.

6 Claims, 4 Drawing Sheets

(58) Field of Classification Search
USPC .......................................................... 701/42
See application file for complete search history.

(56) References Cited

U.S. PATENT DOCUMENTS

| | | | | |
|---|---|---|---|---|
| 2016/0096545 A1* | 4/2016 | Nakakuki | ............ | B62D 5/0469 |
| | | | | 701/41 |
| 2018/0194389 A1 | 7/2018 | Imamura | | |
| 2018/0346018 A1* | 12/2018 | Kataoka | .................. | B62D 6/00 |
| 2019/0367085 A1* | 12/2019 | Kataoka | .................. | B62D 6/10 |

FOREIGN PATENT DOCUMENTS

| | | |
|---|---|---|
| EP | 3 315 383 A1 | 5/2018 |
| JP | 5962881 B1 | 8/2016 |

* cited by examiner

STEERING CONTROL APPARATUS AND STEERING CONTROL METHOD

INCORPORATION BY REFERENCE

The disclosure of Japanese Patent Application No. 2018-130197 filed on Jul. 9, 2018 including the specification, drawings and abstract is incorporated herein by reference in its entirety.

BACKGROUND

1. Technical Field

The disclosure relates to a steering control apparatus and a steering control method.

2. Description of Related Art

An electric power steering (EPS) including an actuator that uses a motor as a drive source is known as a vehicle steering system. Some of such EPSs acquire a steering angle of a steering wheel (a wheel steering angle of steered wheels) in absolute angle including a range over 360°, and execute various control based on the steering angle. For example, Japanese Patent No. 5962881 (JP 5962881 B) describes a system that, before a rack end that is an end of a rack shaft strikes a rack housing, reduces an impact caused by striking of the rack end (hereinafter, referred to as end-striking impact) by limiting a current command value, which corresponds to a target value of motor torque that a motor outputs, such that the current command value is less than or equal to a limit value (target current limit value) based on a steering angle.

SUMMARY

Incidentally, for example, on a low-μ road, steered wheels easily turn because of a small surface resistance, and the steered wheels can quickly turn even with a small torque. For this reason, even when the current command value is limited to less than or equal to the limit value as in the case of the above configuration, the inertia of turn may not sufficiently attenuate, with the result that an end-striking impact may not be reduced. In this way, there is still room for improvement.

The disclosure provides a steering control apparatus and steering control method that are able to suitably reduce an end-striking impact even on a low-μ road.

A first aspect of the disclosure relates to a steering control apparatus for a steering system to which a motor torque that reciprocates a wheel turning shaft of a steering mechanism is applied by an actuator that uses a motor as a drive source. The steering control apparatus includes a controller. The controller is configured to compute a torque command value that is a target value of the motor torque that the motor outputs. The controller is configured to, when an absolute value of a rotation angle of a rotary shaft exceeds a steering angle threshold for the steering system, compute a steering angle limit value that reduces with an increase in the absolute value of the rotation angle. The rotation angle of the rotary shaft is convertible to a wheel steering angle of a steered wheel coupled to the wheel turning shaft. The controller is configured to set a limit value to less than or equal to the steering angle limit value. The limit value is an upper limit of an absolute value of the torque command value. The controller is configured to control the motor such that the motor torque follows the torque command value whose absolute value is limited to less than or equal to the limit value. The controller is configured to compute a basic command value based on a steering torque. The controller is configured to, when the absolute value of the rotation angle exceeds the steering angle threshold, compute a damping control amount such that the damping control amount increases with an increase in an excess of an angular velocity of the rotary shaft over a first upper limit angular velocity set according to the absolute value of the rotation angle. The controller is configured to compute the torque command value based on a value obtained by combining the basic command value and the damping control amount such that an absolute value of the basic command value is reduced.

With the above configuration, the steering angle limit value is computed so as to reduce when the absolute value of the rotation angle of the rotary shaft exceeds the steering angle threshold, the rotation angle of the rotary shaft being convertible to the wheel steering angle of the steered wheel, and the torque command value that is the target value of the motor torque that the motor outputs is limited to less than or equal to the limit value that is set to the value less than or equal to the steering angle limit value. Thus, for example, when steering is performed to near an end in the case where the steering angle threshold is set to a value near the end, the motor torque is limited, with the result that an end-striking impact is reduced. In addition, with the above configuration, when the absolute value of the rotation angle exceeds the steering angle threshold, the torque command value is computed by reducing the absolute value of the basic command value by using the damping control amount set according to an excess of the angular velocity over the first upper limit angular velocity. Therefore, in the case where the steering angle threshold is set to, for example, near an end, when the steered wheel is on a low-μ road and the wheel steering speed increases, the damping control amount increases, with the result that the motor torque is limited. Therefore, an end-striking impact is suitably reduced.

In the steering control apparatus, the controller may be configured to compute the steering angle limit value based on a value obtained by subtracting an angle limiting component and a speed limiting component from a value based on a rated torque set in advance as the motor torque that the motor outputs. The controller may be configured to, when the absolute value of the rotation angle exceeds the steering angle threshold, compute the angle limiting component such that the angle limiting component increases with an increase in the absolute value of the rotation angle. The controller may be configured to compute the speed limiting component such that the speed limiting component increases with an increase in an excess of the angular velocity of the rotary shaft over a second upper limit angular velocity set according to the absolute value of the rotation angle.

With the above configuration, the steering angle limit value is computed by subtracting the angle limiting component and the speed limiting component from the rated torque, so, when the rotation angle exceeds the steering angle threshold, a further increase in the rotation angle is limited, and the steering angle limit value that limits the angular velocity of the rotary shaft is easily computed.

In the steering control apparatus, an absolute value of the first upper limit angular velocity may be set to higher than an absolute value of the second upper limit angular velocity. Since the angular velocity of the rotary shaft tends to be significantly higher on a low-μ road than on a normal road surface, even when the first upper limit angular velocity is increased, an excess of the angular velocity over the first upper limit angular velocity arises, and the damping control amount that reduces the absolute value of the basic command value is computed. Therefore, as in the case of the above configuration, when the first upper limit angular velocity is set to higher than the second upper limit angular velocity, an end-striking impact is suitably reduced on a low-μ road, and influence on a steering feeling caused by an unnecessary reduction of the absolute value of the basic command value on a road other than the low-μ road is reduced.

In the steering control apparatus, the controller may be configured to set the limit value to a minimum one of the steering angle limit value and another limit value set based on a state quantity other than the rotation angle or the angular velocity of the rotary shaft.

In the steering control apparatus, the controller may be configured to set the limit value to a minimum one of the steering angle limit value and another limit value set based on a power supply voltage.

With the above configuration, in a situation other than when the rotation angle exceeds the steering angle threshold, the limit value is set in consideration of a situation in which the motor torque needs to be limited, so the motor torque is appropriately limited according to various situations. Since a minimum one of the steering angle limit value and another limit value is set for the limit value, the limit value does not exceed the steering angle limit value, so, for example, when the steering angle threshold is set to a value near an end, an end-striking impact is suitably reduced.

A second aspect of the disclosure relates to a steering control method for a steering system to which a motor torque that reciprocates a wheel turning shaft of a steering mechanism is applied by an actuator that uses a motor as a drive source. The steering control method includes computing, by a controller, a torque command value that is a target value of the motor torque that the motor outputs, when an absolute value of a rotation angle of a rotary shaft exceeds a steering angle threshold for the steering system, computing, by the controller, a steering angle limit value that reduces with an increase in the absolute value of the rotation angle, the rotation angle of the rotary shaft being convertible to a wheel steering angle of a steered wheel coupled to the wheel turning shaft, setting, by the controller, a limit value to less than or equal to the steering angle limit value, the limit value being an upper limit of an absolute value of the torque command value, controlling, by the controller, the motor such that the motor torque follows the torque command value whose absolute value is limited to less than or equal to the limit value, computing, by the controller, a basic command value based on a steering torque, when the absolute value of the rotation angle exceeds the steering angle threshold, computing, by the controller, a damping control amount such that the damping control amount increases with an increase in an excess of an angular velocity of the rotary shaft over a first upper limit angular velocity set according to the absolute value of the rotation angle, and computing, by the controller, the torque command value based on a value obtained by combining the basic command value and the damping control amount such that an absolute value of the basic command value is reduced.

According to the aspects of the disclosure, an end-striking impact is suitably reduced even on a low-μ road.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
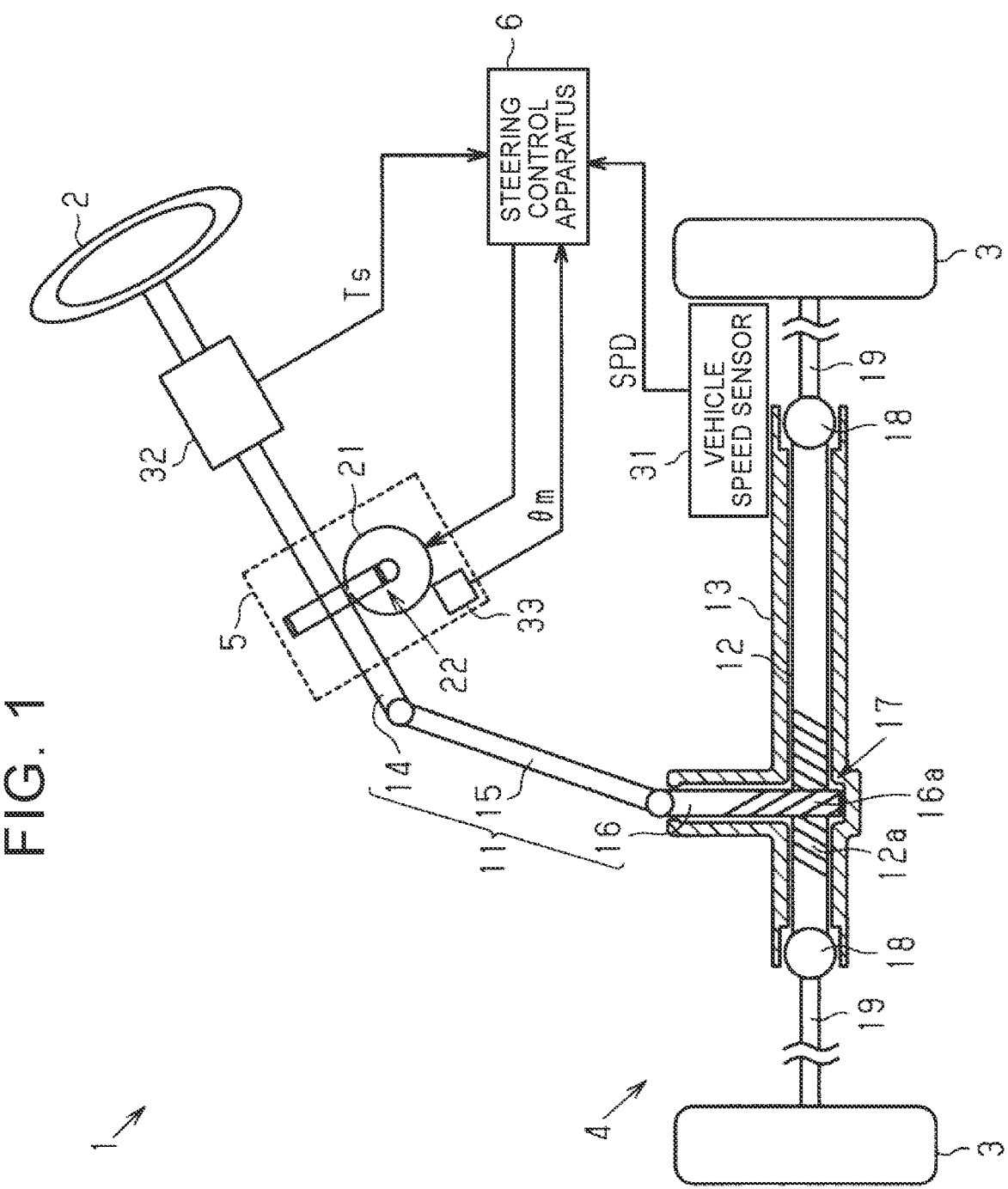
FIG. 1 is a schematic configuration diagram of an electric power steering.

Hereinafter, an embodiment of a steering control apparatus will be described with reference to the accompanying drawings. As shown in FIG. 1, an electric power steering (EPS) 1 that serves as a steering system that is a controlled object includes a steering mechanism 4. The steering mechanism 4 turns steered wheels 3 based on driver's operation of a steering wheel 2. The EPS 1 includes an EPS actuator 5 and a steering control apparatus 6. The EPS actuator 5 serves as an actuator that applies assist force for assisting in steering operation to the steering mechanism 4. The steering control apparatus 6 controls the operation of the EPS actuator 5.

The steering mechanism 4 includes a steering shaft 11, a rack shaft 12, and a substantially cylindrical rack housing 13. The steering wheel 2 is fixed to the steering shaft 11. The rack shaft 12 serves as a wheel turning shaft that reciprocates in an axial direction with the rotation of the steering shaft 11. The rack shaft 12 is inserted in the rack housing 13 such that the rack shaft 12 can reciprocate. The steering shaft 11 is made up of a column shaft 14, an intermediate shaft 15, and a pinion shaft 16 coupled to each other in order from the steering wheel 2 side.

The rack shaft 12 and the pinion shaft 16 are disposed inside the rack housing 13 at a predetermined crossing angle. When rack teeth 12a of the rack shaft 12 and pinion teeth 16a of the pinion shaft 16 are in mesh with each other, a rack and pinion mechanism 17 is provided. A tie rod 19 is coupled to each end of the rack shaft 12 via a rack end 18 so as to be pivotable. The rack end 18 is a ball joint provided at the shaft end of the tie rod 19. The distal end of the tie rod 19 is coupled to a knuckle (not shown) to which the steered wheel 3 is assembled. Therefore, in the EPS 1, the rotation of the steering shaft 11 resulting from steering operation is converted to the movement of the rack shaft 12 in the axial direction by the rack and pinion mechanism 17, and the movement in the axial direction is transmitted to the knuckles via the tie rods 19, with the result that a wheel steering angle of the steered wheels 3, that is, the direction of travel of a vehicle, is changed.

A position at which the rack end 18 contacts with the left end of the rack housing 13 is a position to which the vehicle is fully steerable rightward, and the position corresponds to a rack end position as a right-side end position. A position at which the rack end 18 contacts with the right end of the rack housing 13 is a position to which the vehicle is fully steerable leftward, and the position corresponds to a rack end position as a left-side end position.

The EPS actuator 5 includes a motor 21 and a reduction mechanism 22. The motor 21 is a drive source. The reduction mechanism 22 is a worm and wheel. The reduction mechanism 22 is coupled to the motor 21, and is also coupled to the column shaft 14. The EPS actuator 5 applies motor torque to the steering mechanism 4 as assist force by reducing the speed of rotation of the motor 21 with the reduction mechanism 22 and transmitting the rotation to the column shaft 14. A three-phase brushless motor is employed as the motor 21 of the present embodiment.

A vehicle speed sensor 31 and a torque sensor 32 are connected to the steering control apparatus 6. The vehicle speed sensor 31 detects a vehicle speed SPD of the vehicle. The torque sensor 32 detects a steering torque Ts applied to the steering shaft 11 through driver's steering. A rotation sensor 33 is connected to the steering control apparatus 6. The rotation sensor 33 detects a motor angle θm of the motor 21 in a relative angle within the range of 360°. The steering torque Ts and the motor angle θm are detected as positive values when the driver steers in one direction (right side in the present embodiment) and detected as negative values when the driver steers in the other direction (left side in the present embodiment). The steering control apparatus 6 controls the operation of the EPS actuator 5, that is, assist force that is applied to the steering mechanism 4 to reciprocate the rack shaft 12, by supplying driving electric power to the motor 21 based on the signals indicating state quantities that are input from the sensors.

Figure 2:
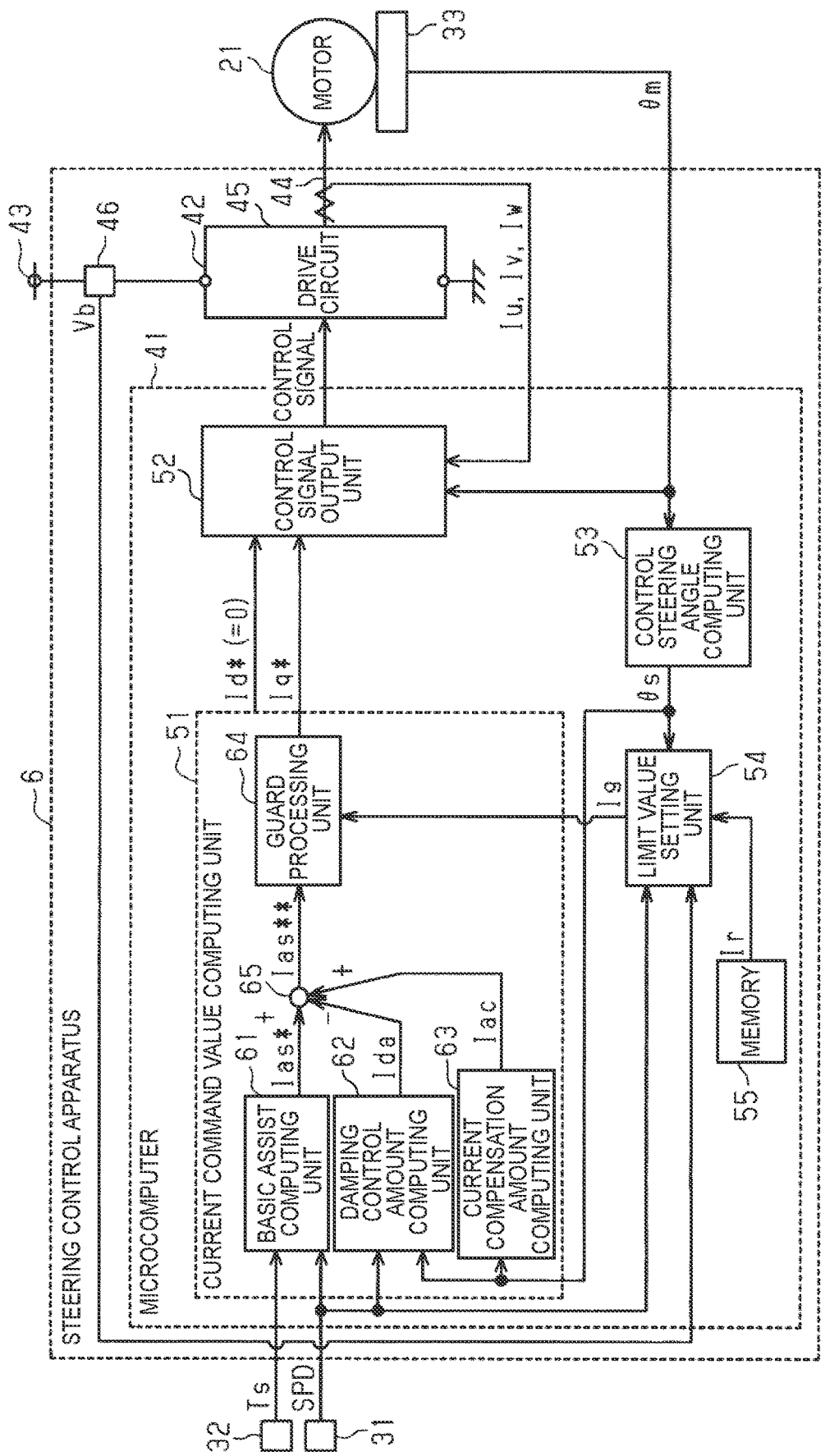
FIG. 2 is a block diagram of a steering control apparatus.

Next, the configuration of the steering control apparatus 6 will be described. As shown in FIG. 2, the steering control apparatus 6 includes a microcomputer 41 and a driving circuit 42. The microcomputer 41 outputs control signals. The driving circuit 42 supplies driving electric power to the motor 21 based on the control signals. A known PWM inverter including a plurality of switching elements (such as FETs) is employed as the driving circuit 42 of the present embodiment. The control signals that the microcomputer 41 outputs regulate the on/off states of the switching elements. Thus, the switching elements turn on or off in response to the control signals, and the pattern of energizing a motor coil of each phase switches, with the result that direct-current power of an in-vehicle power supply 43 is converted to three-phase driving electric power and the three-phase driving electric power is output to the motor 21. Control blocks that will be described below are implemented by computer programs that the microcomputer 41 runs. State quantities are detected at a predetermined sampling period (detection period), and computation processes that are shown by the control blocks described below are executed at intervals of a predetermined computation period.

The vehicle speed SPD, the steering torque Ts, and the motor angle θm of the motor 21 are input to the microcomputer 41. In addition, phase current values Iu, Iv, Iw of the motor 21 are input to the microcomputer 41. Each of the phase current values Iu, Iv, Iw of the motor 21 is detected by a current sensor 45 provided in a connection line 44 between the driving circuit 42 and the motor coil of the corresponding phase. For the sake of convenience of illustration, FIG. 2 collectively shows the connection lines 44 of the phases as one connection line 44 and collectively shows the current sensors 45 of the phases as one current sensor 45. A voltage sensor 46 is connected to the microcomputer 41. The voltage sensor 46 detects a power supply voltage Vb of the in-vehicle power supply 43. The microcomputer 41 outputs control signals based on these state quantities.

Specifically, the microcomputer 41 includes a current command value computing unit 51 and a control signal output unit 52. The current command value computing unit 51 computes current command values Id*, Iq* that may be regarded as a target value of electric power that is supplied to the motor 21, that is, a target assist force. The control signal output unit 52 outputs control signals based on the current command values Id*, Iq*. The current command values Id*, Iq* are target values of currents to be supplied to the motor 21, and respectively indicate a current command value on a d-axis and a current command value on a q-axis in a d-q coordinate system. Of these, the q-axis current command value Iq* may be regarded as a torque command value that is a target value of the output torque of the motor 21. The current command value computing unit 51 may be regarded as a torque command value computing unit. In the present embodiment, the d-axis current command value Id* is basically fixed to zero. As in the case of the motor angle θm of the motor 21, the current command values Id*, Iq* are positive values when the system assists in steering in one direction and are negative values when the system assists in steering in the other direction.

The microcomputer 41 includes a control steering angle computing unit 53. The control steering angle computing unit 53 computes a control steering angle θs. The control steering angle θs indicates a rotation angle (steering angle) of the steering shaft 11. The rotation angle (steering angle) of the steering shaft 11 can be converted to the wheel steering angle of the steered wheels 3. The motor angle θm is input to the control steering angle computing unit 53. The control steering angle computing unit 53, for example, integrates (counts) the number of rotations of the motor 21 with the origin (zero degrees) set to a control steering angle θs in a state where the rack shaft 12 is placed at a neutral position in which the vehicle travels straight ahead, and computes the control steering angle θs in absolute angle including the range over 360° based on the number of rotations and the motor angle θm. The control steering angle θs, as in the case of the motor angle θm of the motor 21, is a positive value in the case of a rotation angle in one direction from the neutral position and is a negative value in the case of a rotation angle in the other direction. The microcomputer 41 includes a limit value setting unit 54 and a memory 55. The limit value setting unit 54 sets a limit value Ig that is an upper limit of the absolute value of the q-axis current command value Iq*. A rated current Ir corresponding to a rated torque set in advance as a motor torque that the motor 21 is able to output, or other information, is stored in the memory 55.

More specifically, the current command value computing unit 51 includes a basic assist computing unit 61, a damping control amount computing unit 62, and a current compensation amount computing unit 63. The basic assist computing unit 61 serves as a basic command value computing unit that computes a basic current command value Ias* as a basic command value that is a basic component of the q-axis current command value Iq*. The damping control amount computing unit 62 computes a damping control amount Ida. The current compensation amount computing unit 63 computes a current compensation amount Iac. The current command value computing unit 51 includes a guard processing unit 64 that limits the absolute value of a corrected current command value Ias to less than or equal to the limit value Ig. The corrected current command value Ias is obtained by correcting the basic current command value Ias* using the damping control amount Ida and the current compensation amount Iac.

The steering torque Ts and the vehicle speed SPD are input to the basic assist computing unit 61. The basic assist computing unit 61 computes the basic current command value Ias* based on the steering torque Ts and the vehicle speed SPD. Specifically, the basic assist computing unit 61 computes the basic current command value Ias* such that the basic current command value Ias* has a greater value (absolute value) as the absolute value of the steering torque Ts increases or as the vehicle speed SPD decreases. The thus computed basic current command value Ias* is output to an adder-subtractor 65.

The control steering angle $\theta s$ is input to the current compensation amount computing unit 63. At the time of steering return operation to return the steering wheel 2 to the neutral position, the current compensation amount computing unit 63 computes the current compensation amount Iac to assist such that the control steering angle $\theta s$ smoothly becomes zero (the steering wheel 2 is placed at the neutral position) based on the control steering angle $\theta s$. That is, the current compensation amount computing unit 63 computes a component for executing so-called active return control.

The damping control amount Ida that is output from the damping control amount computing unit 62 as will be described later is input to the adder-subtractor 65 together with the basic current command value Ias* and the current compensation amount Iac. The current command value computing unit 51 computes the corrected current command value Ias** by subtracting the damping control amount Ida from the basic current command value Ias* and adding the current compensation amount Iac to the basic current command value Ias* in the adder-subtractor 65. The thus computed corrected current command value Ias** is output to the guard processing unit 64.

The limit value Ig that is set in the limit value setting unit 54 as will be described later is input to the guard processing unit 64 in addition to the corrected current command value Ias. When the absolute value of the input corrected current command value Ias is less than or equal to the limit value Ig, the guard processing unit 64 directly sets the value of the corrected current command value Ias** for the q-axis current command value Iq* and outputs the q-axis current command value Iq* to the control signal output unit 52. On the other hand, when the absolute value of the input corrected current command value Ias is greater than the limit value Ig, the guard processing unit 64 sets a value obtained by limiting the absolute value of the corrected current command value Ias to the limit value Ig for the q-axis current command value Iq* and outputs the q-axis current command value Iq* to the control signal output unit 52.

The control signal output unit 52 generates control signals by executing current feedback control in the d-q coordinate system based on the current command values Id*, Iq*, the phase current values Iu, Iv, Iw, and the motor angle $\theta m$ of the motor 21. Specifically, the control signal output unit 52 computes a d-axis current value and a q-axis current value by mapping the phase current values Iu, Iv, Iw onto the d-q coordinate system based on the motor angle $\theta m$. The d-axis current value and the q-axis current value are actual current values of the motor 21 in the d-q coordinate system. The control signal output unit 52 generates control signals by executing current feedback control so as to cause the d-axis current value to follow the d-axis current command value Id* and cause the q-axis current value to follow the q-axis current command value Iq*. When the control signals are output to the driving circuit 42, driving electric power set according to the control signals is supplied to the motor 21. Thus, the motor 21 is controlled such that the motor torque that the motor 21 outputs follows the torque command value corresponding to the q-axis current command value Iq*.

Next, the configuration of the damping control amount computing unit 62 will be described. The vehicle speed SPD and the control steering angle $\theta s$ are input to the damping control amount computing unit 62. Based on these state quantities, when the absolute value of the control steering angle $\theta s$ exceeds a near-end steering angle $\theta ne$ as a steering angle threshold, the damping control amount computing unit 62 computes the damping control amount Ida having a greater absolute value based on an increase in the absolute value of a control angular velocity $\omega s$ (steering speed) that is obtained by differentiating the control steering angle $\theta s$. The damping control amount Ida is a component for reducing the absolute value of the basic current command value Ias* by being subtracted from the basic current command value Ias*. The near-end steering angle $\theta ne$ is set to a value indicating an angle less by a predetermined angle $\theta 1$ in absolute value than the control steering angle $\theta s$ at a rack end position. The predetermined angle $\theta 1$ is a relatively small angle such that the near-end steering angle $\theta ne$ is not too separated from the rack end position.

Figure 3:
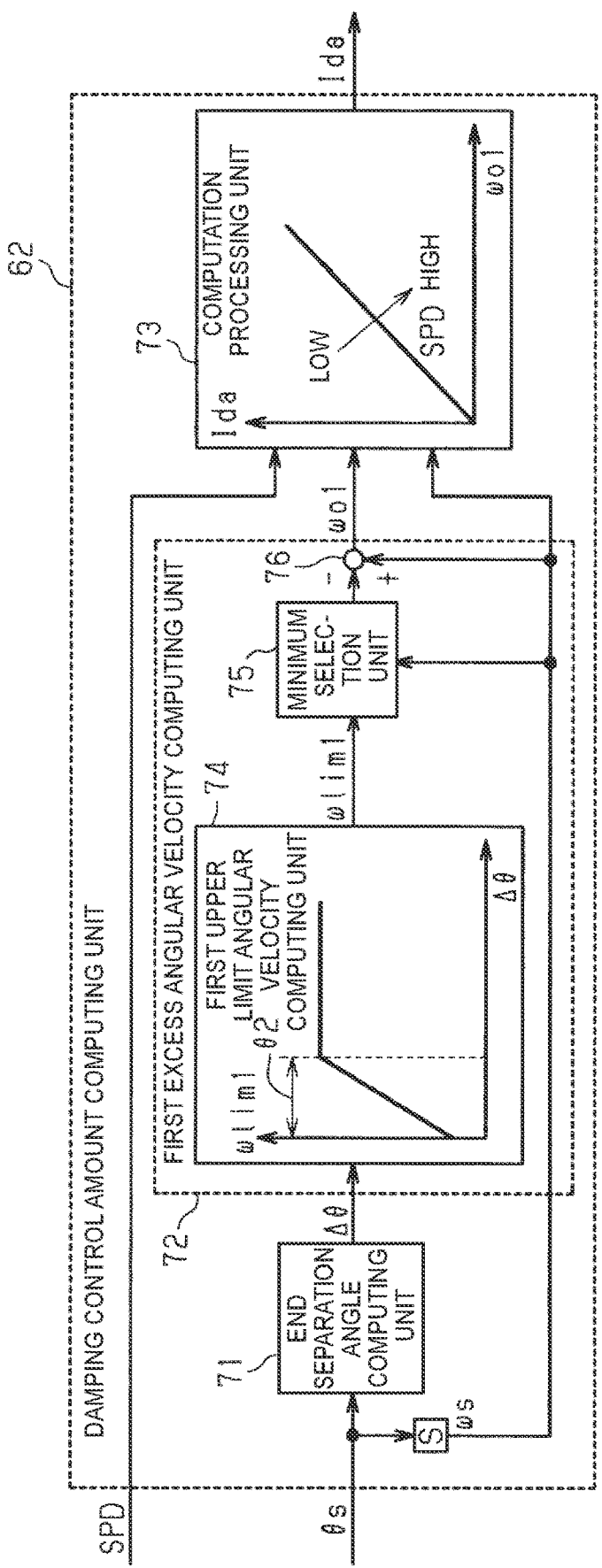
FIG. 3 is a block diagram of a damping control amount computing unit.

In details, as shown in FIG. 3, the damping control amount computing unit 62 includes an end separation angle computing unit 71. The end separation angle computing unit 71 computes an end separation angle $\Delta\theta$ that is the difference between the control steering angle $\theta s$ in the latest computation period and the control steering angle $\theta s$ at any one of the right and left rack end positions. The damping control amount computing unit 62 further includes a first excess angular velocity computing unit 72 and a computation processing unit 73. The first excess angular velocity computing unit 72 computes a first excess angular velocity $\omega o1$ that is an excess of the control angular velocity $\omega s$ over a first upper limit angular velocity $\omega lim1$ that is determined according to the end separation angle $\Delta\theta$. The computation processing unit 73 computes the damping control amount Ida based on the first excess angular velocity $\omega o1$.

The control steering angle $\theta s$ is input to the end separation angle computing unit 71. The end separation angle computing unit 71 computes the difference between the control steering angle $\theta s$ at the latest computation period and the control steering angle $\theta s$ at the left-side rack end position and the difference between the control steering angle $\theta s$ at the latest computation period and the control steering angle $\theta s$ at the right-side rack end position. The end separation angle computing unit 71 outputs the absolute value of a smaller one of the computed differences to the first excess angular velocity computing unit 72 as the end separation angle $\Delta\theta$.

The end separation angle $\Delta\theta$ and the control angular velocity $\omega s$ that is obtained by differentiating the control steering angle $\theta s$ are input to the first excess angular velocity computing unit 72. The first excess angular velocity computing unit 72 computes the first excess angular velocity $\omega o1$ based on these state quantities.

In details, the first excess angular velocity computing unit 72 includes a first upper limit angular velocity computing unit 74 to which the end separation angle $\Delta\theta$ is input. The first upper limit angular velocity computing unit 74 has a map that defines the relationship between the end separation angle $\Delta\theta$ and the first upper limit angular velocity $\omega lim1$, and computes the first upper limit angular velocity $\omega lim1$ set according to the end separation angle $\Delta\theta$ by consulting the map. In this map, the first upper limit angular velocity $\omega lim1$ is set such that the first upper limit angular velocity $\omega lim1$ is the lowest when the end separation angle $\Delta\theta$ is zero and the first upper limit angular velocity $\omega lim1$ increases in proportion to an increase in the end separation angle $\Delta\theta$. The first upper limit angular velocity $\omega lim1$ is set to a constant value set in advance as the maximum angular velocity to which the motor 21 is allowed to rotate when the end separation angle $\Delta\theta$ becomes greater than a predetermined angle $\theta 2$. The predetermined angle $\theta 2$ is set to an angle greater than the predetermined angle $\theta 1$. That is, the damping control amount computing unit 62 of the present embodiment computes the damping control amount Ida having an absolute value greater than zero in a situation before the absolute value of the control steering angle θs exceeds the near-end steering angle θne. Thus, when the situation shifts into a situation in which the absolute value of the control steering angle θs exceeds the near-end steering angle θne, the damping control amount computing unit 62 computes the damping control amount Ida having an absolute value greater than zero.

When the absolute value of the control angular velocity ωs is greater than the first upper limit angular velocity ω lim1 computed by the first upper limit angular velocity computing unit 74, the first excess angular velocity computing unit 72 outputs an excess of the control angular velocity ωs over the first upper limit angular velocity ω lim1 to the computation processing unit 73 as the first excess angular velocity ωo1. On the other hand, when the absolute value of the control angular velocity ωs is less than the first upper limit angular velocity ω lim1, the first excess angular velocity computing unit 72 outputs the first excess angular velocity ωo1 indicating zero to the computation processing unit 73.

Specifically, the first excess angular velocity computing unit 72 includes a minimum selection unit 75 to which the first upper limit angular velocity ω lim1 and the control angular velocity ωs are input. The minimum selection unit 75 selects a smaller one of the first upper limit angular velocity ωlim1 and the absolute value of the control angular velocity ωs and outputs the selected one to a subtractor 76. The first excess angular velocity computing unit 72 computes the first excess angular velocity ωo1 by subtracting the output value of the minimum selection unit 75 from the absolute value of the control angular velocity ωs in the subtractor 76. Since the minimum selection unit 75 selects a smaller one of the first upper limit angular velocity ωlim1 and the absolute value of the control angular velocity ωs in this way, the control angular velocity ωs is subtracted from the control angular velocity ωs in the subtractor 76 when the absolute value of the control angular velocity ωs is less than or equal to the first upper limit angular velocity ωlim1, with the result that the first excess angular velocity ωo1 becomes zero. On the other hand, when the absolute value of the control angular velocity ωs is greater than the first upper limit angular velocity ω lim1, the first upper limit angular velocity ω lim1 is subtracted from the absolute value of the control angular velocity ωs in the subtractor 76, and the first excess angular velocity ωo1 is an excess of the control angular velocity ωs over the first upper limit angular velocity ω lim1.

The first excess angular velocity ωo1, the vehicle speed SPD, and the control angular velocity ωs are input to the computation processing unit 73. The computation processing unit 73 has a map that defines the relationship between the damping control amount Ida and both the first excess angular velocity ωo1 and the vehicle speed SPD, and computes the damping control amount Ida set according to the first excess angular velocity ωo1 and the vehicle speed SPD by consulting the map. The computation processing unit 73 sets the sign (direction) of the damping control amount Ida for the sign (direction) that is indicated by the control angular velocity ωs. In this map, the damping control amount Ida is set such that a speed limiting component Igs is a minimum value when the first excess angular velocity ωo1 is zero and the damping control amount Ida increases in proportion to an increase in the first excess angular velocity ωo1. This map is also set such that the damping control amount Ida reduces in proportion to an increase in the vehicle speed SPD. The thus computed damping control amount Ida is output to the adder-subtractor 65 (see FIG. 2).

Next, the configuration of the limit value setting unit 54 will be described. As shown in FIG. 2, the control steering angle θs, the vehicle speed SPD, the power supply voltage Vb, and the rated current Ir stored in the memory 55 are input to the limit value setting unit 54. The limit value setting unit 54 sets the limit value Ig based on these state quantities.

Figure 4:
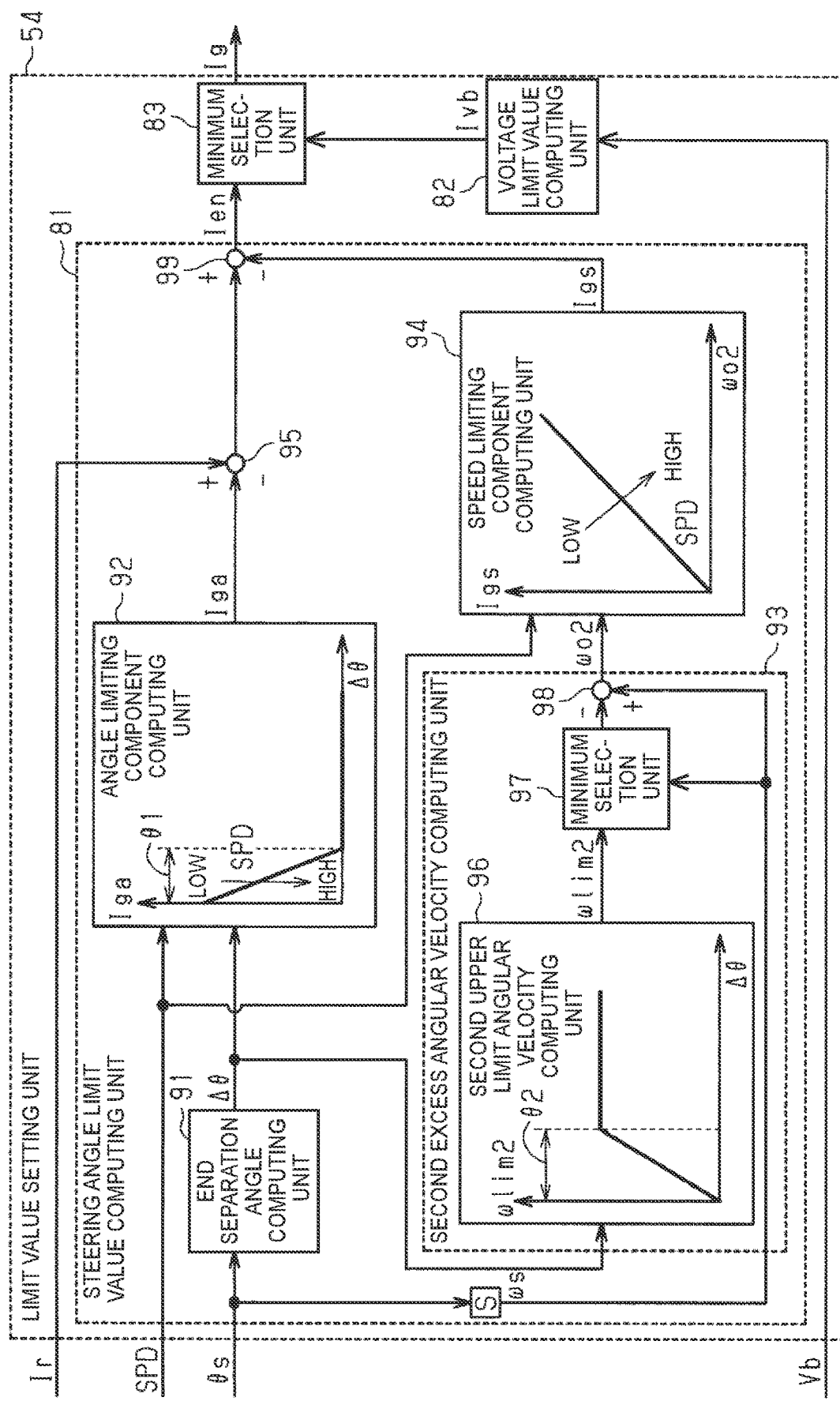
FIG. 4 is a block diagram of a limit value setting unit.

In details, as shown in FIG. 4, the limit value setting unit 54 includes a steering angle limit value computing unit 81, a voltage limit value computing unit 82, and a minimum selection unit 83. The steering angle limit value computing unit 81 computes a steering angle limit value Ien based on the control steering angle θs. The voltage limit value computing unit 82 computes a voltage limit value Ivb as another limit value based on the power supply voltage Vb. The minimum selection unit 83 selects a smaller one of the steering angle limit value Ien and the voltage limit value Ivb.

The control steering angle θs, the vehicle speed SPD, and the rated current Ir are input to the steering angle limit value computing unit 81. Based on these state quantities, when the absolute value of the control steering angle θs exceeds the near-end steering angle θne as will be described later, the steering angle limit value computing unit 81 computes the steering angle limit value Ien that reduces with an increase in the absolute value of the control steering angle θs and the absolute value of the control angular velocity ωs (steering speed). The thus computed steering angle limit value Ien is output to the minimum selection unit 83.

The power supply voltage Vb is input to the voltage limit value computing unit 82. The voltage limit value computing unit 82 computes the voltage limit value Ivb for supplying a voltage lower than the rated voltage for supplying the rated current Ir when the absolute value of the power supply voltage Vb becomes lower than or equal to a voltage threshold Vth set in advance. Specifically, when the absolute value of the power supply voltage Vb becomes lower than or equal to the voltage threshold Vth, the voltage limit value computing unit 82 computes the voltage limit value Ivb having a smaller absolute value with a decrease in the absolute value of the power supply voltage Vb. The thus computed voltage limit value Ivb is output to the minimum selection unit 83.

The minimum selection unit 83 selects a smaller one of the input steering angle limit value Ien and the input voltage limit value Ivb as the limit value Ig, and outputs the selected one to the guard processing unit 64 (see FIG. 2). Next, the configuration of the steering angle limit value computing unit 81 will be described.

The steering angle limit value computing unit 81 includes an end separation angle computing unit 91 and an angle limiting component computing unit 92. The end separation angle computing unit 91 computes an end separation angle Δθ. The angle limiting component computing unit 92 computes an angle limiting component Iga that is a current (torque) limiting amount that is determined according to the end separation angle Δθ. The steering angle limit value computing unit 81 further includes a second excess angular velocity computing unit 93 and a speed limiting component computing unit 94. The second excess angular velocity computing unit 93 computes a second excess angular velocity ω o2 that is an excess of the control angular velocity ωs over a second upper limit angular velocity ω lim2 that is determined according to the end separation angle Δθ. The speed limiting component computing unit 94 computes a speed limiting component Igs that is a current (torque) limit value that is determined according to the second excess angular velocity $\omega o2$. The end separation angle computing unit 91 computes the end separation angle $\Delta\theta$ as in the case of the end separation angle computing unit 71 of the damping control amount computing unit 62, and outputs the end separation angle $\Delta\theta$ to the angle limiting component computing unit 92 and the second excess angular velocity computing unit 93.

The end separation angle $\Delta\theta$ and the vehicle speed SPD are input to the angle limiting component computing unit 92. The angle limiting component computing unit 92 has a map that defines the relationship between the angle limiting component Iga and both the end separation angle $\Delta\theta$ and the vehicle speed SPD, and computes the angle limiting component Iga set according to the end separation angle $\Delta\theta$ and the vehicle speed SPD by consulting the map. In this map, the angle limiting component Iga is the greatest when the end separation angle $\Delta\theta$ is zero, and reduces in proportion to an increase in the end separation angle $\Delta\theta$. The angle limiting component Iga is set so as to become zero when the end separation angle $\Delta\theta$ becomes greater than the predetermined angle $\theta1$ (when the absolute value of the control steering angle $\theta s$ becomes less than the near-end steering angle $\theta ne$). This map is set such that, in the range in which the end separation angle $\Delta\theta$ is less than or equal to the predetermined angle $\theta1$, the angle limiting component Iga reduces with an increase in the vehicle speed SPD. The thus computed angle limiting component Iga is output to a subtractor 95.

The end separation angle $\Delta\theta$ and the control angular velocity $\omega s$ obtained by differentiating the control steering angle $\theta s$ are input to the second excess angular velocity computing unit 93. The second excess angular velocity computing unit 93 computes the second excess angular velocity $\omega o2$ based on these state quantities.

In details, the second excess angular velocity computing unit 93 includes a second upper limit angular velocity computing unit 96 to which the end separation angle $\Delta\theta$ is input. The second upper limit angular velocity computing unit 96 has a map that defines the relationship between the end separation angle $\Delta\theta$ and the second upper limit angular velocity $\omega lim2$, and computes the second upper limit angular velocity $\omega lim2$ set according to the end separation angle $\Delta\theta$ by consulting the map. This map is set to a similar tendency to the map of the first upper limit angular velocity computing unit 74. More specifically, the second upper limit angular velocity $\omega lim2$ in the range in which the end separation angle $\Delta\theta$ is less than or equal to the predetermined angle $\theta2$ in the map is lower than the first upper limit angular velocity $\omega lim1$ in the corresponding range in the map of the first upper limit angular velocity computing unit 74, and is set so as to decrease with a reduction in the end separation angle $\Delta\theta$ at the same slope as the first upper limit angular velocity $\omega lim1$. The second upper limit angular velocity $\omega lim2$ in the range in which the end separation angle $\Delta\theta$ is greater than the predetermined angle $\theta2$ in the map is set to a constant value lower than the first upper limit angular velocity $\omega lim1$.

When the absolute value of the control angular velocity $\omega s$ is greater than the second upper limit angular velocity $\omega lim2$ computed by the second upper limit angular velocity computing unit 96, the second excess angular velocity computing unit 93 outputs an excess of the control angular velocity $\omega s$ over the second upper limit angular velocity $\omega lim2$ to the speed limiting component computing unit 94 as the second excess angular velocity $\omega o2$. On the other hand, when the absolute value of the control angular velocity $\omega s$ is less than or equal to the second upper limit angular velocity $\omega lim2$, the second excess angular velocity computing unit 93 outputs the second excess angular velocity $\omega o2$ indicating zero to the speed limiting component computing unit 94. The second excess angular velocity computing unit 93 includes a minimum selection unit 97 and a subtractor 98, and computes the second excess angular velocity $\omega o2$ as in the case of the first excess angular velocity computing unit 72.

The second excess angular velocity $\omega o2$ and the vehicle speed SPD are input to the speed limiting component computing unit 94. The speed limiting component computing unit 94 has a map that defines the relationship between the speed limiting component Igs and both the second excess angular velocity $\omega o2$ and the vehicle speed SPD, and computes the speed limiting component Igs set according to the second excess angular velocity $\omega o2$ and the vehicle speed SPD by consulting the map. In this map, the speed limiting component Igs is set such that the speed limiting component Igs is the smallest when the second excess angular velocity $\omega o2$ is zero and the speed limiting component Igs increases in proportion to an increase in the second excess angular velocity $\omega o2$. This map is set such that the speed limiting component Igs reduces with an increase in the vehicle speed SPD. That is, the map of the speed limiting component computing unit 94 of the present embodiment is set as in the case of the map of the computation processing unit 73 of the damping control amount computing unit 62. This map is set such that the speed limiting component Igs is less than the angle limiting component Iga. The thus computed speed limiting component Igs is output to a subtractor 99.

The rated current Ir is input to the subtractor 95 to which the angle limiting component Iga is input. The steering angle limit value computing unit 81 outputs a value obtained by subtracting the angle limiting component Iga from the rated current Ir in the subtractor 95 to the subtractor 99 to which the speed limiting component Igs is input. The steering angle limit value computing unit 81 outputs a value obtained by subtracting the speed limiting component Igs from the output value of the subtractor 95, that is, a value obtained by subtracting the angle limiting component Iga and the speed limiting component Igs from the rated current Ir, in the subtractor 99 to the minimum selection unit 83 as the steering angle limit value Ien.

Next, reduction of an end-striking impact with the steering control apparatus 6 of the present embodiment will be described. It is assumed that, when steering is performed to near the rack end position, the limit value Ig is set to the steering angle limit value Ien less than the rated current Ir, and the absolute value of the q-axis current command value Iq* (corrected current command value Ias**) is set to the limit value Ig. As described above, the steering angle limit value Ien is a value obtained by subtracting the angle limiting component Iga and the speed limiting component Igs from the rated current Ir, and the motor torque is limited according to the end separation angle $\Delta\theta$ by the angle limiting component Iga and is limited according to the second excess angular velocity $\omega o2$ by the speed limiting component Igs. Thus, an end-striking impact is reduced by not only limiting a further reduction in the end separation angle $\Delta\theta$ when the end separation angle $\Delta\theta$ becomes less than or equal to the predetermined angle $\theta1$ but also limiting the control angular velocity $\omega s$ when the end separation angle $\Delta\theta$ becomes less than or equal to the predetermined angle $\theta2$.

It is assumed that steering is performed to near the rack end position as described above on a low-μ road. In this case, even when the absolute value of the q-axis current command value Iq* is limited to the limit value Ig, the control angular velocity ωs becomes a large value. In terms of this point, in the present embodiment, the corrected current command value Ias** is computed by subtracting the damping control amount Ida from the basic current command value Ias*, and the damping control amount Ida increases with an increase in the first excess angular velocity ωo1 of the control angular velocity ωs over the first upper limit angular velocity ω lim1. Thus, when the control angular velocity ωs increases on a low-μ road, or the like, the absolute value of the corrected current command value Ias** reduces according to the absolute value of the damping control amount Ida, with the result that an end-striking impact is reduced.

As described above, the slope of the first upper limit angular velocity ωlim1 in the range less than or equal to the predetermined angle θ2 in the map of the first excess angular velocity computing unit 72 is equal to the slope of the second upper limit angular velocity ωlim2 in the range less than or equal to the predetermined angle θ2 in the map of the second excess angular velocity computing unit 93. Therefore, when steering is performed to the rack end position, the tendency of a change in the first excess angular velocity ωo1 is equal to the tendency of a change in the second excess angular velocity ω o2. Thus, reduction of an end-striking impact based on the steering angle limit value Ien that originates from the speed limiting component Igs and reduction of an end-striking impact with the damping control amount Ida provide close steering feelings, so the driver is less likely to experience a feeling of strangeness.

The operation and advantageous effects of the present embodiment will be described.

(1) The steering angle limit value computing unit 81 computes the steering angle limit value Ien that reduces when the absolute value of the control steering angle θs exceeds the near-end steering angle θne. The current command value computing unit 51 limits the q-axis current command value Iq* to less than or equal to the limit value Ig that is set to a value less than or equal to the steering angle limit value Ien. Thus, for example, when steering is performed to near an end, the motor torque is limited, so an end-striking impact is reduced. In addition, in the present embodiment, the current command value computing unit 51 computes the q-axis current command value Iq* by reducing the absolute value of the basic current command value Ias* with the damping control amount Ida set according to the first excess angular velocity ωo1 that increases when the absolute value of the control steering angle θs exceeds the near-end steering angle θne. Therefore, when the steered wheels 3 are on a low-μ road and the wheel steering speed increases, the damping control amount Ida increases, with the result that the motor torque is limited. Therefore, an end-striking impact is suitably reduced.

(2) The steering angle limit value computing unit 81 computes the steering angle limit value Ien by subtracting the angle limiting component Iga and the speed limiting component Igs from the rated current Ir corresponding to the rated torque. Therefore, when the control steering angle θs exceeds the near-end steering angle θne, it is possible to easily compute the steering angle limit value Ien that limits a further increase in the control steering angle θs and that limits the control angular velocity ωs.

(3) The absolute value of the first upper limit angular velocity ωlim1 is set to higher than the absolute value of the second upper limit angular velocity ω lim2. Since the control angular velocity ωs (the wheel steering speed of the steered wheels 3) tends to be significantly higher on a low-μ road than on a normal road surface, even when the first upper limit angular velocity ωlim1 is increased, an excess of the control angular velocity ωs over the first upper limit angular velocity ωlim1 arises, and the damping control amount Ida is computed. Therefore, as in the case of the present embodiment, when the first upper limit angular velocity ω lim1 is set to higher than the second upper limit angular velocity ωlim2, an end-striking impact is suitably reduced on a low-μ road, and influence on a steering feeling caused by an unnecessary reduction of the absolute value of the basic current command value Ias* on a road other than the low-μ road is reduced.

(4) Since the limit value setting unit 54 sets a smaller one of the voltage limit value Ivb set based on the power supply voltage Vb and the steering angle limit value Ten for the limit value Ig, the motor torque Tm is appropriately limited according to a situation in which the power supply voltage Vb has decreased, other than the fact that the control steering angle θs exceeds the near-end steering angle θne. Since a smaller one of the voltage limit value Ivb and the steering angle limit value Ien is set for the limit value Ig, the limit value Ig does not exceed the steering angle limit value Ien, so an end-striking impact is suitably reduced.

(5) Since the damping control amount computing unit 62 computes the damping control amount Ida such that the damping control amount Ida reduces with an increase in the vehicle speed SPD, so the q-axis current command value Iq* is hard to reduce when the vehicle speed SPD is high. Thus, for example, when abrupt steering is made to avoid an obstacle while the vehicle is traveling at a high speed, interference with the steering is reduced.

The present embodiment may be modified as follows. The present embodiment and the following modifications may be implemented in combination with each other without any technical contradiction.

In the above embodiment, the shape of the map in the first upper limit angular velocity computing unit 74 may be changed as needed. For example, the predetermined angle θ1 may be an angle at which the first upper limit angular velocity ωlim1 begins to reduce. The first upper limit angular velocity ωlim1 in the range less than or equal to the predetermined angle θ2 in the map of the first upper limit angular velocity computing unit 74 may coincide with the second upper limit angular velocity ω lim2 in the range less than or equal to the predetermined angle θ2 in the map of the second upper limit angular velocity computing unit 96, or the slopes of the first upper limit angular velocity ω lim1 and second upper limit angular velocity ωlim2 in those ranges may be different from each other. Other than these, the first upper limit angular velocity ωlim1 in the range greater than the predetermined angle θ2 in the map of the first upper limit angular velocity computing unit 74 may be equal to the second upper limit angular velocity ω lim2 in the range greater than the predetermined angle θ2 in the map of the second upper limit angular velocity computing unit 96. Similarly, the shape of the map in the second upper limit angular velocity computing unit 96 may be changed as needed.

In the above-described embodiment, the shape of the map in the angle limiting component computing unit 92 may be changed as needed. For example, an angle at which the angle limiting component Iga begins to increase may be set for the predetermined angle θ2. In the range less than or equal to the predetermined angle θ1 in the map, the angle limiting component Iga may nonlinearly vary. Furthermore, the angle limiting component Iga may be not changed according to the vehicle speed SPD.

In the above-described embodiment, the shape of the map of the computation processing unit 73 may be changed as needed. For example, the shape of the map of the computation processing unit 73 may be set such that the damping control amount Ida nonlinearly increases with an increase in the first excess angular velocity $\omega o1$. The damping control amount Ida may be not changed according to the vehicle speed SPD. Similarly, the shape of the map in the speed limiting component computing unit 94 may be changed as needed.

In the above-described embodiment, a value obtained by subtracting the damping control amount Ida from the basic current command value Ias* and then adding the current compensation amount Iac to the subtracted result undergoes a guard process based on the limit value Ig; however, the guard process is not limited thereto. For example, a value obtained by subtracting the damping control amount Ida from the basic current command value Ias* without adding the current compensation amount Iac may undergo a guard process based on the limit value Ig.

In the above-described embodiment, the current compensation amount Iac is computed as a control amount for assisting in returning the steering wheel 2 to the neutral position; however, the current compensation amount Iac is not limited thereto. For example, the current compensation amount Iac may be a control amount based on a torque differential value obtained by differentiating the steering torque Ts, or another control amount.

In the above-described embodiment, the limit value setting unit 54 includes the voltage limit value computing unit 82 that computes the voltage limit value Ivb based on the power supply voltage Vb; however, the limit value setting unit 54 is not limited thereto. The limit value setting unit 54 may include another computing unit that computes another limit value based on another state quantity in addition to or instead of the voltage limit value computing unit 82. Alternatively, the limit value setting unit 54 may be configured to directly set the steering angle limit value Ien as the limit value Ig without including the voltage limit value computing unit 82.

In the above-described embodiment, the steering angle limit value Ien may be computed by subtracting only the angle limiting component Iga from the rated current Ir. In the above-described embodiment, the steering angle threshold may be set to an angle other than the near-end steering angle $\theta ne$.

In the above-described embodiment, the control steering angle computing unit 53 integrates the number of rotations of the motor 21 with the origin set to the control steering angle $\theta s$ in a state where the rack shaft 12 is placed at the steering neutral position, and computes the control steering angle $\theta s$ based on the number of rotations and the motor angle $\theta m$. However, the control steering angle computing unit 53 is not limited thereto. The control steering angle computing unit 53 may compute a control steering angle or an end separation angle based on, for example, the number of rotations and the motor angle $\theta m$ with the origin set to the control steering angle at the rack end position and compute the limit value Ig based on these values. The origin of such a control steering angle may be, for example, stored in advance during manufacturing of the vehicle or set by learning through steering. Alternatively, for example, a sensor that detects in absolute angle the rotation angle of the steering shaft 11 that is the rotary shaft and whose rotation angle is convertible to the wheel steering angle of the steered wheels 3 may be provided, and the control steering angle computing unit 53 may compute the control steering angle $\theta s$ based on the rotation angle detected by the sensor.

In the above-described embodiment, the steering control apparatus 6 uses the EPS 1 of a type whose EPS actuator 5 applies motor torque to the column shaft 14, as a controlled object; however, the controlled object is not limited to the EPS 1. For example, the steering control apparatus 6 may use a steering system of a type that applies motor torque to the rack shaft 12 via, for example, a ball screw nut, as a controlled object. Not limited to an EPS, the steering control apparatus 6 may use a steer-by-wire steering system in which transmission of power is separated between a steering unit that is operated by a driver and a wheel steering unit that steers steered wheels, as a controlled object, and may execute control for reducing an end-striking impact as in the case of the present embodiment over a torque command value (q-axis current command value) of the motor of a wheel steering actuator provided in the wheel steering unit.

Next, a technical idea that can be derived from the above-described embodiment and modifications is as follows. A steering control apparatus computes the damping control amount such that the damping control amount reduces with an increase in vehicle speed. With this configuration, since the torque command value is hard to reduce when the vehicle speed is high, interference with, for example, abrupt steering for avoiding an obstacle while the vehicle is travelling at a high speed is reduced.

What is claimed is:

1. A steering control apparatus for a steering system to which a motor torque that reciprocates a wheel turning shaft of a steering mechanism is applied by an actuator that uses a motor as a drive source, the steering control apparatus comprising
a controller configured to:
compute a torque command value that is a target value of the motor torque that the motor outputs;
when an absolute value of a rotation angle of a rotary shaft exceeds a steering angle threshold for the steering system, compute a steering angle limit value that reduces with an increase in the absolute value of the rotation angle, the rotation angle of the rotary shaft being convertible to a wheel steering angle of a steered wheel coupled to the wheel turning shaft;
set a limit value to less than or equal to the steering angle limit value, the limit value being an upper limit of an absolute value of the torque command value;
control the motor such that the motor torque follows the torque command value whose absolute value is limited to less than or equal to the limit value;
compute a basic command value based on a steering torque;
when the absolute value of the rotation angle exceeds the steering angle threshold, compute a damping control amount such that the damping control amount increases with an increase in an excess of an angular velocity of the rotary shaft over a first upper limit angular velocity set according to the absolute value of the rotation angle; and
compute the torque command value based on a value obtained by combining the basic command value and the damping control amount such that an absolute value of the basic command value is reduced.

2. The steering control apparatus according to claim 1, wherein:
the controller is configured to compute the steering angle limit value based on a value obtained by subtracting an angle limiting component and a speed limiting component from a value based on a rated torque set in advance as the motor torque that the motor outputs;
the controller is configured to, when the absolute value of the rotation angle exceeds the steering angle threshold, compute the angle limiting component such that the angle limiting component increases with an increase in the absolute value of the rotation angle; and
the controller is configured to compute the speed limiting component such that the speed limiting component increases with an increase in an excess of the angular velocity of the rotary shaft over a second upper limit angular velocity set according to the absolute value of the rotation angle.

3. The steering control apparatus according to claim 2, wherein an absolute value of the first upper limit angular velocity is set to higher than an absolute value of the second upper limit angular velocity.

4. The steering control apparatus according to claim 1, wherein the controller is configured to set the limit value to a minimum one of the steering angle limit value and another limit value set based on a state quantity other than the rotation angle or the angular velocity of the rotary shaft.

5. The steering control apparatus according to claim 4, wherein the controller is configured to set the limit value to a minimum one of the steering angle limit value and another limit value set based on a power supply voltage.

6. A steering control method for a steering system to which a motor torque that reciprocates a wheel turning shaft of a steering mechanism is applied by an actuator that uses a motor as a drive source, the steering control method comprising:

computing, by a controller, a torque command value that is a target value of the motor torque that the motor outputs;
when an absolute value of a rotation angle of a rotary shaft exceeds a steering angle threshold for the steering system, computing, by the controller, a steering angle limit value that reduces with an increase in the absolute value of the rotation angle, the rotation angle of the rotary shaft being convertible to a wheel steering angle of a steered wheel coupled to the wheel turning shaft;
setting, by the controller, a limit value to less than or equal to the steering angle limit value, the limit value being an upper limit of an absolute value of the torque command value;
controlling, by the controller, the motor such that the motor torque follows the torque command value whose absolute value is limited to less than or equal to the limit value;
computing, by the controller, a basic command value based on a steering torque;
when the absolute value of the rotation angle exceeds the steering angle threshold, computing, by the controller, a damping control amount such that the damping control amount increases with an increase in an excess of an angular velocity of the rotary shaft over a first upper limit angular velocity set according to the absolute value of the rotation angle; and
computing, by the controller, the torque command value based on a value obtained by combining the basic command value and the damping control amount such that an absolute value of the basic command value is reduced.

* * * * *